United States Patent [19]

Shimomura et al.

[11] Patent Number: 4,529,339
[45] Date of Patent: Jul. 16, 1985

[54] CUTTER INSERT

[75] Inventors: Hiroshi Shimomura, Tokyo; Tatsuo Arai, Kitamoto, both of Japan

[73] Assignee: Mitsubishi Kinzoku Kabushiki Kaisha, Tokyo, Japan

[21] Appl. No.: 479,134

[22] Filed: Mar. 25, 1983

[30] Foreign Application Priority Data

Mar. 30, 1982 [JP] Japan .................................. 57-51868

[51] Int. Cl.³ .............................................. B26D 1/00
[52] U.S. Cl. ..................................... 407/36; 407/42; 407/114
[58] Field of Search .................................... 407/34–42, 407/49, 58, 61, 112, 113, 114

[56] References Cited

U.S. PATENT DOCUMENTS

| 2,102,478 | 12/1937 | Miller | 407/38 |
| 2,367,221 | 1/1945 | Kraus | 407/39 |
| 3,104,453 | 9/1963 | Greenleaf | 407/49 |
| 3,116,538 | 1/1964 | Severson | 407/41 |
| 3,163,919 | 1/1965 | Turner | 407/38 |
| 3,273,222 | 9/1966 | Begle | 407/38 |
| 3,281,920 | 11/1966 | Eriksson | 407/113 |
| 3,339,257 | 9/1967 | Hargreaves et al. | 407/49 |
| 3,378,901 | 4/1968 | Dupuis | 407/38 |
| 3,821,837 | 7/1974 | Faber | 407/112 |
| 3,868,752 | 3/1975 | Hopkins | 407/42 |

FOREIGN PATENT DOCUMENTS

| 024597 | 3/1981 | European Pat. Off. | 407/40 |
| 137413 | 6/1978 | Fed. Rep. of Germany | 407/36 |
| 2811086 | 10/1978 | Fed. Rep. of Germany | 407/49 |
| 69888 | 6/1979 | Japan | 407/36 |

Primary Examiner—Leonidas Vlachos
Attorney, Agent, or Firm—Cushman, Darby & Cushman

[57] ABSTRACT

A cutter insert of the indexable type comprises a plate of a generally quadrilateral shape including a front face, a rear face and four side faces. The cutter insert has two peripheral cutting edges defined by two opposite side faces and the front face. A pair of notches are formed in two diagonal corners of the cutter insert, and the other two diagonal corners are chamfered to provide respective corner faces which define together with the front face a pair of end cutting edges.

6 Claims, 13 Drawing Figures

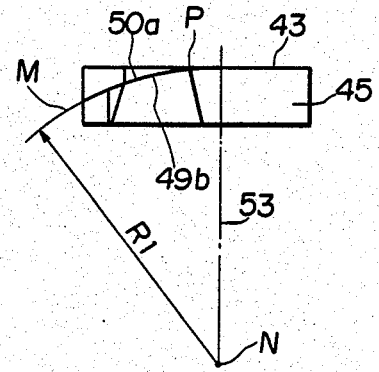
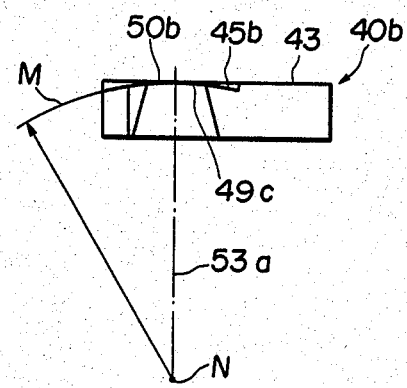
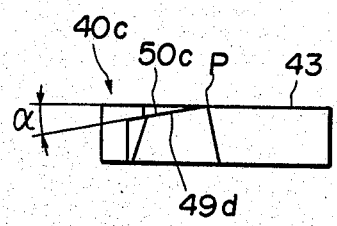
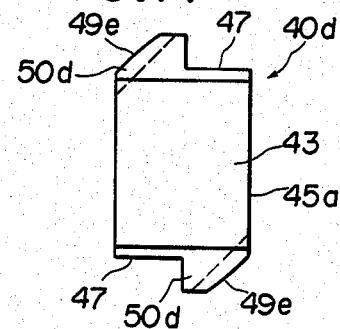
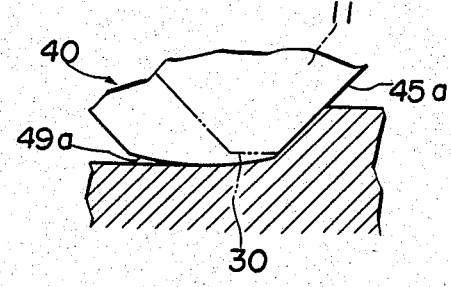
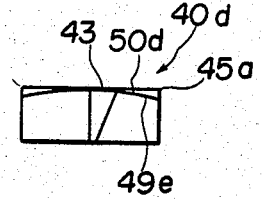

CUTTER INSERT

BACKGROUND OF THE INVENTION

1. Field of the Invention

This invention relates to cutter inserts of a generally quadrilateral shape having a peripheral cutting edge and an end cutting edge, such cutter inserts being adapted to be employed in a cutter such as a face milling cutter, a boring cutter and a side milling cutter.

2. Prior Art

FIG. 1 shows a face milling cutter 10 employing conventional cutter inserts 11 of a rectangular shape. The face milling cutter 10 comprises a body 12 including a base portion 13 of a circular cross-section having a forward end face 14, a rearward end face 15 and a circumferential surface 16 lying between the forward end face 14 and the rearward end face 15. A boss 17 extends coaxially from the base portion 13 at its rearward face 15 and is adapted to be fixedly secured to a spindle of a milling machine.

The base portion 13 of the cutter body 12 has a plurality of generally radially outwardly-opening recesses 20 formed in the circumferential surface 16 in circumferentially spaced relation to each other and disposed adjacent to the forward end face 14. Each of the recesses 20 has a generally channel-shaped cross-section and has a first flat bearing surface 21 sloping radially outwardly in a direction away from the forward end face 14 and extending to the circumferential surface 16. The recess 20 also has a forward end wall 22 which faces in a direction away from the forward end face 14 and is sloping radially outwardly toward the forward end face 14. The forward end wall 22 is defined by a forward end projection 23. The forward end wall 22 is stepped or raised at its distal end to form a second flat bearing surface 24 which is disposed at right angles to the first bearing surface 21.

The rectangular insert 11 of the indexable type comprises a plate of metal such as high speed steel. The rectangular insert 11 is defined by a front face 25, a rear face parallel to the front face 25, a pair of parallel longer side faces 26 and a pair of parallel shorter side faces 27. Four corners of the rectangular insert 11 are chamfered to form four corner faces. Two diagonal corner faces are sloping from the front face 25 to the rear face and directed to each other. Two corner edges 30 defined by respective corner faces and the front face 25 serve as auxiliary cutting edges which constitute end cutting edges. Two edges 26a defined by the two longer side faces 26 and the front face 25 serve as two main cutting edges, respectively, which constitute peripheral cutting edges. Similarly, the other two diagonal corner faces are sloping from the rear face to the front face 25 and directed toward each other. Two corner edges 30 defined by respective corner faces and the rear face serve as auxiliary cutting edges. Two edges 26a defined by the two longer side faces 26 and the rear face serve as two main cutting edges, respectively.

The rectangular insert 11 is received in the recess 20 with one longer side face 26 held against the first bearing surface 21 and with one shorter side face 27 held against the second bearing surface 24. In this condition, the main or peripheral cutting edge 26a remote from the first bearing surface 21 and its mating auxiliary or end cutting edge 30 are disposed in their respective indexed positions, as shown in FIG. 1.

The auxiliary or end cutting edges 30 of the inserts 11 serve to provide a finish surface of a workpiece processed by the face milling cutter 10. The cutter body 12 and each insert 11 are so designed that the indexed auxiliary cutting edges 30 of all the inserts are disposed substantially in a common plane perpendicular to an axis X of rotation of the cutter body 12. Actually, however, there are occasions when the indexed auxiliary cutting edges 30 are disposed slightly out of their indexed position, i.e., the above-mentioned common plane. This will result in an unsatisfactory finish surface of the workpiece.

SUMMARY OF THE INVENTION

It is therefore an object of this invention to provide a cutter insert for use in a cutter of the type described above which insert has an auxiliary or end cutting edge to efficiently provide a satisfactory finish surface of a workpiece processed by the cutter.

According to the present invention, there is provided a cutter insert of the indexable type for a cutter including a base portion of a circular cross-section having a forward end face and a circumferential surface, said body having a plurality of generally radially outwardly-opening recesses formed in the circumferential surface and disposed adjacent to the forward end face, each of the recesses including a first bearing surface sloping radially outwardly in a direction away from the forward end face and extending to the circumferential surface, the recess also including a second bearing surface sloping radially outwardly toward the forward end face, and the second bearing surface being disposed forwardly of the first bearing surface and disposed at a predetermined angle relative to the first bearing surface; said cutter insert comprising a plate of a generally quadrilateral shape defined by a front face, a rear face and four side faces; said cutter insert having two peripheral cutting edges defined by two opposite side faces and said front face; said cutter insert having a pair of notches formed in two diagonal corners thereof, each of said notches having a surface disposed transversely of said peripheral cutting edge; the other two diagonal corners of said cutter insert being chamfered to provide respective corner faces which define together with said front face a pair of end cutting edges; that portion of said front face disposed adjacent to and extending along each end cutting edge serving as a rake surface of said end cutting edge; said cutter insert being adapted to be received in said recess; and either of said two opposite side faces being adapted to be held against said first bearing surface of said cutter body while said surface of said notch is adapted to be held against said second bearing surface of said cutter body.

BRIEF DESCRIPTION OF THE DRAWINGS

FIG. 8 is a view of the cutter insert of FIG. 5 as viewed in a direction VIII of FIG. 6;

FIG. 9 is a view similar to FIG. 8 but showing another modified cutter insert;

FIG. 10 is a view similar to FIG. 8 but showing a further modified cutter insert;

FIG. 11 is a plan view of a still further modified cutter insert;

FIG. 12 is a front elevational view of the cutter insert of FIG. 11; and

FIG. 13 is a view showing the cutter insert of FIG. 2 during a cutting operation.

DESCRIPTION OF THE PREFERRED EMBODIMENTS OF THE INVENTION

Figure 1:
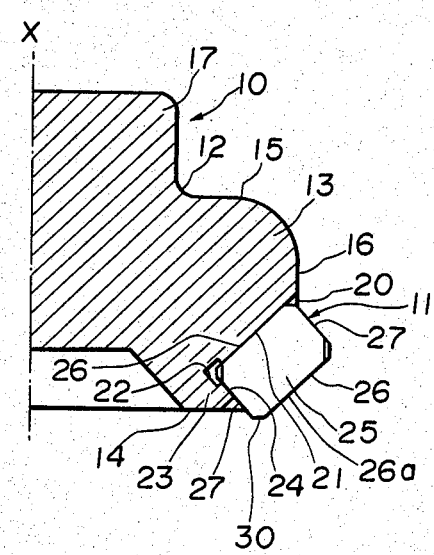
FIG. 1 is a cross-sectional view of a portion of a cutter employing conventional cutter inserts.
Figure 2:
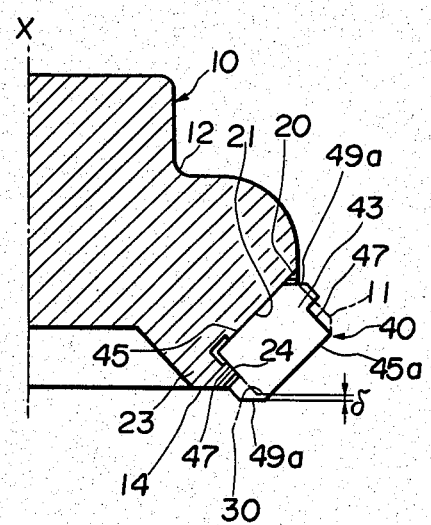
FIG. 2 a view similar to FIG. 1 but showing a cutter insert provided in accordance with the present invention.
Figure 3:
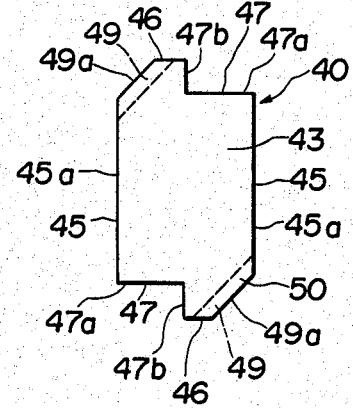
FIG. 3 is a plan view of the cutter insert of FIG. 2.
Figure 6:
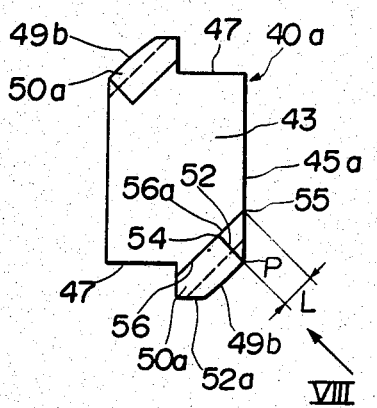
FIG. 6 is a plan view of the cutter insert of FIG. 5.
Figure 4:
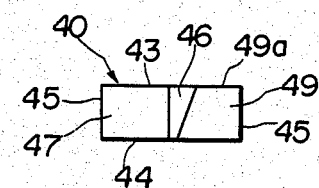
FIG. 4 is a front elevational view of the cutter insert of FIG. 2.
Figure 7:
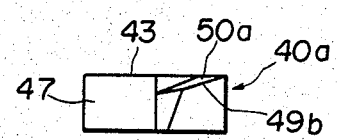
FIG. 7 is a front elevational view of the cutter insert of FIG. 5.

FIG. 2 shows a face milling cutter 10 employing a plurality of identical rectangular inserts 11 and at least one insert 40 having a longer auxiliary or end cutting edge 49a. The face milling cutter 10 of FIG. 2 is identical in construction to that shown in FIG. 1. The rectangular inserts 11 and the insert 40 are received in a plurality of recesses 20, one rectangular insert 11 being shown in phantom in FIG. 2 for illustration purpose. As best shown in FIGS. 3 and 4, the insert 40 comprises a metal plate of a generally rectangular shape defined by a front face 43, a rear face 44, a pair of parallel longer side faces 45, and a pair of parallel shorter side faces 46. The insert 40 may be of any quadrilateral shape such as a square, a parallelogram and a rhombus.

A pair of notches 47 are formed in two diagonal corners of the insert 40. Each of the notches 47 has an L-shaped contour defined by a pair of right angularly-disposed surfaces 47a and 47b, the surface 47a being disposed parallel to the shorter side face 46. Thus, the surface 47a is disposed transversely of the main cutting edge 45a. The other two diagonal corners of the insert 40 are chamfered to provide corner faces 49, the two corner faces 49 being sloping from the front face 43 to the rear face 44 and directed toward each other. Two edges 49a defined by the respective corner faces 49 and the front face 43 serve as auxiliary or end cutting edges. Two edges 45a defined by the respective longer side faces 45 and the front face 43 serve as main or peripheral cutting edges. The two notches 47 as well as the two auxiliary cutting edges 49a are disposed symmetrically with respect to the center of the insert 40.

As shown in FIG. 2, the insert 40 is received in a recess 20 with one longer side face 45 held against a first bearing surface 21 and with the surface 47a of one notch 47 adjacent to the one longer side face 45 being held against a second bearing surface 24. In this condition, the main cutting edge 45 remote from the first bearing surface 21 and the auxiliary cutting edge 49a adjacent to the one notch 47 are disposed in their respective indexed positions.

The straight auxiliary cutting edges 30 of the rectangular inserts 11 are disposed slightly beyond the forward end face 14 of the cutter body 12. As shown in FIG. 2, the auxiliary cutting edge 49a of the insert 40 projects slightly forwardly from the auxiliary cutting edges 30 of the rectangular inserts 11 a distance δ (usually 0.05 to 0.1 mm). By virtue of the provision of the notch 47, the auxiliary cutting edge 49a has a substantially greater length than the auxiliary cutting edge 30 of the rectangular insert 11.

The auxiliary cutting edge 49a of the insert 40 is disposed in a plane substantially perpendicular to the axis X of rotation of the cutter body 12. The outer end of the auxiliary cutting edge 49a of the insert 40 is disposed slightly radially inwardly of the outer end of the auxiliary cutting edge 30 of each rectangular insert 11 as shown in FIG. 2, but the outer end of the auxiliary cutting edge 49a and the outer end of the auxiliary cutting edge 30 may be disposed radially equidistantly from the axis X of rotation of the cutter body 12.

As described above, since the auxiliary cutting edge 49a of the insert 40 is substantially longer than the auxiliary cutting edge 30 of each rectangular insert 11 and projects slightly beyond the auxiliary cutting edges 30, the auxiliary cutting edge 49a serves to provide a satisfactory finish surface of a workpiece processed by the face milling cutter 10.

That portion 50 of the front face 43 disposed adjacent to and extending along each auxiliary cutting edge 49a serves as a rake surface of the auxiliary cutting edge 49a.

FIGS. 5 to 8 show a modified insert 40a which differs from the insert 40 in that a rake surface 50a of each auxiliary cutting edge 49b is convexly arcuate, the arcuate rake surface 50a being curved along the auxiliary cutting edge 49b and having a predetermined radius $R_1$ of curvature. Therefore, each auxiliary cutting edge 49b is correspondingly arcuate. The arcuate rake surface 50a extends to a point P of intersection between the auxiliary cutting edge 49b and the main cutting edge 45a, so that the main cutting edge 45a is not sacrificed at all. An inner end 52 of the arcuate rake surface 50a terminates in the front face 43 as best shown in FIG. 8. The arcuate rake surface 50a is curved from its inner end 52 toward its outer end 52a in a direction away from the front face 43. The arcuate rake surface 50a lies on a circle M (FIG. 8). A line 53, passing through the center N of the circle M and disposed perpendicular to the front face 43, is spaced from the point P of intersection a distance of at least half a distance L (FIG. 6) between the inner corner 54 of the arcuate rake surface 50a and a point 55 on the main cutting edge 45a through which point an extension line 56a of the inner edge 56 of the arcuate rake surface 50a passes. With this arrangement, the arcuate rake surface 50a can be easily machined or formed so that it terminates in the front face 43 at its inner end 52 at which the point P of intersection lies.

FIG. 9 shows another modified insert 40b which differs from the insert 40a of FIGS. 5 to 8 in that each arcuate rake surface 50b is so formed that a line 53a, passing through a center N of a circle M and disposed perpendicular to a front face 43, passes centrally of the length of an auxiliary cutting edge 49c, the arcuate rake surface 50b lying on the circle M. The arcuate rake surface 50b lies substantially flush with the front face 43 at the center of the auxiliary cutting edge. That portion 45b of a main cutting edge 45a adjacent to the auxiliary cutting edge 49c does not actually serve as the main cutting edge.

FIG. 10 shows a further modified insert 40 which differs from the insert 40 of FIGS. 3 and 4 in that a flat rake surface 50c is inclined at a predetermined angle relative to a front face 43. The flat rake surface 50c extends along a straight auxiliary cutting edge 49d and is sloping in a direction away from the front face 43, and the straight auxiliary cutting edge 49d extends to a point P of intersection between the auxiliary cutting edge 49d and a main cutting edge 45a. With this construction, the radial rake angle of the rake surface 50c becomes more positive by the amount of the predetermined angle α so that the auxiliary or end cutting edge 49d has a better cutting performance.

Figure 5:
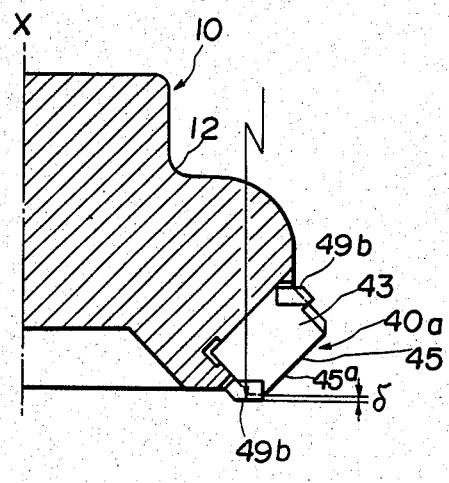
FIG. 5 is a view similar to FIG. 1 but showing a modified cutter insert.

FIGS. 11 and 12 show a still further modified insert 40d which differs from the insert 40 of FIGS. 3 to 5 in that a rake surface 50d of each auxiliary cutting edge 49e is convexly arcuate in such a manner that an axis (not shown) of a cylindrical surface on which the arcuate rake surface 50d lies is disposed in parallel relation to a main cutting edge 45a, as best shown in FIG. 12. Also, as shown in FIG. 12, the arcuate rake surface 50d is curved toward the adjacent main cutting edge 45a in a direction away from a front face 43. Thus, the auxiliary cutting edge 49e is also convexly arcuate.

The arcuate rake surfaces 50a, 50b and 50d serve as a chip breaker for dividing cuttings of the workpiece into pieces.

As described above, the longer auxiliary or end cutting edges of the inserts 40, 40a, 40b, 40c and 40d serve to provide a satisfactory finish surface of the workpiece during a cutting operation. Further, since the surface 47a of the notch 47 adapted to be held in abutment with the second bearing surface 24 of the cutter body 12 is disposed near the indexed auxiliary or end cutting edge, the indexed auxiliary cutting edge is located in its proper indexed position.

FIG. 13 shows a manner in which the insert 40 cuts a workpiece W. What is claimed is:

1. A rotary cutter comprising:
   (a) A body of a generally circular cross-section and having an axis of rotation therethrough at its center, said body being of a one-piece construction and having a forward end face and a circumferential surface, said body having a plurality of generally radially outwardly-opening recesses formed in said circumferential surface and disposed adjacent to said forward end face, each of said recesses including a first bearing surface sloping radially outwardly in a direction away from said forward end face and extending to said circumferential surface, the recess also including a second bearing sufrace sloping radially outwardly toward said forward end face, said second bearing surface being disposed forwardly of said first bearing surface and disposed at a predetermined angle relative to said first bearing surface;
   (b) a plurality of cutter inserts received in said recesses, respectively, each of said inserts comprising a plate of a generally rectangular shape defined by a front face, a rear face and four side faces, said insert having two peripheral cutting edges defined by two opposite side faces and said front face, said insert having a pair of notches formed in two diagonal corners thereof, each of said notches having a surface disposed transversely of said peripheral cutting edge, the other two diagonal corners of said insert being chamfered to provide respective corner faces which define together with said front face a pair of end cutting edge, that portion of said front face disposed adjacent to and extending along each end cutting edge serving as a rake surface of said end cutting edge, and one of said two opposite side faces being held against said first bearing surface of said cutter body while said surface of said notch is held against said second bearing surface of said cutter body.

2. A cutter according to claim 1, in which each of said notches has an L-shaped contour.

3. A cutter according to claim 1, in which said rake surface of each end cutting edge is convexly arcuate.

4. A cutter according to claim 3, in which said arcuate rake surface lies on a circle, and a line, passing through a center of said circle and disposed perpendicular to said front face, passes centrally of the length of said end cutting edge.

5. A cutter according to claim 3, in which an axis of a cylindrical surface on which said arcuate rake surface lies is disposed in parallel relation to said peripheral cutting edge.

6. A cutter according to claim 1, in which said rake surface is flat and is inclined at a predetermined angle relative to said front face, said flat rake surface sloping along said end cutting edge toward said notch adjacent thereto in a direction away from said front face.

* * * * *